Patented June 28, 1949

2,474,392

UNITED STATES PATENT OFFICE 2,474,392

PROCESS OF PREPARING A WATER-SOLUBLE BERYLLIUM COMPOUND

Perle N. Burkard and Ralph McNabney, Wyandotte, Mich., assignors to Wyandotte Chemicals Corporation, Wyandotte, Mich., a corporation of Michigan No Drawing. Application April 26, 1944, Serial No. 532,886

5 Claims. (Cl. 252—156)

This invention relates to the preparation of water-soluble beryllium compounds believed to be the beryllonates of the alkali metals.

This invention likewise relates to the preparation of a water-soluble beryllonate which per se or added to alkaline components represents an anti-scuffing detergent for glass and ceramics.

There is a disclosure in U. S. Patent #2,063,811 and the corresponding British Patent #435,092 of heating about 16 mols of caustic alkali per 1 mol of beryl, each in a powdered condition in the presence of at least 5% water at from 150–700° C. for from 10 to 12 hours. The silicon is partly solubilized, but the beryllium is left as a water-insoluble compound. U. S. Patent #2,238,206 teaches roasting beryllium ore at about 800–850° C. with just sufficient alkali metal hydroxide or -carbonate to produce a soluble silicate and both insoluble beryllium oxide and aluminum oxide. This mixture is then heated with water and lime to produce insoluble calcium silicate; the mixture is then carbonated with $CO_2$ which converts the aluminum oxide to aluminum carbonate according to patentee's statement, and the beryllium oxide to a soluble compound through the resulting sodium bicarbonate solution (page 2, column 1, lines 64–66). In neither of these patents is a water-soluble product initially formed. A partially soluble product is secured according to Patent #2,324,124 by fusing with mono-sodium phosphate.

It is an object of our invention to produce a water-soluble product by the direct reaction of pulverized beryllium minerals with caustic alkali without dissolution of the caustic alkali or the fusion thereof.

It is another object of our invention to produce a water-soluble product from beryllium ores without heating for long periods of time, and avoiding the use of caustic solutions.

An object of this invention is to react an alkali metal hydroxide, particularly sodium hydroxide, with a water-insoluble beryllium compound in the presence of a very small amount of water to produce a water-soluble product, which is believed to be an alkali metal beryllonate. It is a more specific object of our invention to react water-insoluble naturally occurring silicates and/or oxides of beryllium with a hydroxide of an alkali metal under almost anhydrous conditions to form a water-soluble product of low hydration and of any ratio of alkali metal oxide to beryllium in said product of at least substantially 1:1. Suitable insoluble compounds of beryllium which are commercially available are: beryl, formula $3BeO.Al_2O_3.6SiO_2$; euclase, formula $$2BeO.Al_2O_3.2SiO_2$$

beryllium aluminate, formula $Be(AlO_2)_2$; bromelite, formula $BeO$; phenacite, formula $Be_2SiO_4$ and bertrandite, formula $2Be_2SiO_4.H_2O$.

It is still another object of our invention to improve on prior caustic hydroxide treatments of beryllium ores and to produce soluble compounds by employing a substantially dry caustic (76% $Na_2O$) and a temperature below the fusion point of caustic hydroxide (320° C. for NaOH).

According to our invention a ground, water-insoluble compound of beryllium, such as native finely powdered beryl, is caused to react with pulverized caustic hydroxide, such as NaOH or KOH under heat conditions to give a water-soluble composition analyzing at least $1Na_2O:1BeO$. The reaction proceeds satisfactorily by intimately mixing the aforesaid ingredients and heating. The heating step is preferably carried out in the absence of water except amounts which are absorbed on the surface of the ground mineral and the ground caustic. The amount of water should be below 5% by weight of the resulting mass and it is preferred to have a composition of slightly less than 2%. In no case is an amount of water added sufficient to dissolve the caustic alkali.

The temperature and time of reaction varies in applicants' method. This will depend upon the fineness of subdivision of each of the reactants and the intimacy of admixture. From a commercial standpoint a temperature from about 250° C. up to the fusion point of caustic hydroxide is employed, but temperatures as low as 230° C. can be used if the time aspect is disregarded. Anhydrous sodium hydroxide has a fusion point of about 320° C. The reaction may be carried out in a simple apparatus, such as a suitable externally heated device. As shown in the equations below, water is evolved during the reaction. The resulting reaction product as usually made for detergent purposes contains water. But a product of lesser hydration may be obtained by heating this product at a somewhat elevated temperature. Fusion of the mixture by heat is avoided in either case.

It is surprising to find that practically anhydrous NaOH can solubilize beryl and other ores of beryllium at a temperature below 320° C. and within six hours time. An advantage of our process over higher temperatures and processes using 10% or more water is that no superatmospheric pressure is necessary.

Sodium hydroxide is the preferred reactant on account of its price, but corresponding derivatives of potassium and lithium can be used.

The process is thought to be represented by the following equations for beryl and phenacite respectively:

(1) $32NaOH + (3BeO.Al_2O_3.6SiO_2) \rightarrow$
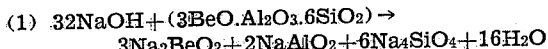

(2) $Be_2SiO_4 + 3NaOH \rightarrow$
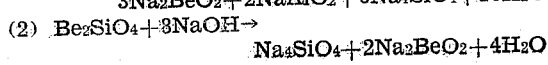

However, this is simply a theory; but the solubility behavior and other phenomena lend plausibility thereto. In accordance with this, both the Be and Al form part of an anionic or electronegative radical in said equations.

According to Equation 1 supra, 32 mols of caustic soda are required to react with the beryl. We employ at least substantially 32 mols of an alkali metal hydroxide to 1 mol of the beryl. It is better to use at least 53 mols of the caustic and preferably 76 mols or more of the caustic to 1 mol of the pulverized beryl.

The following examples will further illustrate how the said invention may be carried out in practice, but the invention is not restricted thereto.

Example 1

A mixture consisting of 80% powdered caustic soda and 20% powdered beryl intimately mixed was placed in a nickel tube. This percentage proportion of the ingredients corresponds substantially to 53 mols of NaOH to 1 mol of beryl. This was placed in an electric furnace and heated at 270° C. for 6 hours. After cooling the contents of the tube were removed. The resulting product was pale blue in color and soluble in water.

Example 2

A 1500 pound batch consisting of 85% caustic soda and 15% beryl finely ground and intimately mixed was placed in a gas-fired pot. This percentage proportion of the ingredients corresponds substantially to 76 mols of NaOH to 1 mol of beryl. This mixture was heated at between 250° C. and 320° C. for about 5 hours. This mixture was then discharged from the pot and spread out on the floor and allowed to cool. The product was in a form permitting easy grinding. This resulting mass was not completely anhydrous, but contained some of the water liberated by the reaction between the caustic soda and the beryl. It is water-soluble. The soluble beryllium product had approximately 8% water content.

In some instances a small amount of unreacted beryl (usually only a few tenths of a per cent) is present in the final product. The heated mass could be cooled in many ways. Running between squeeze rolls is a rapid method which can be employed in commercial practice.

The product from the heat treatment, as can be seen from the equation, will vary with the composition of the initial beryllium reactant. When the mineral beryl is employed both an alkali silicate and alkali aluminate are present. These two components do not require separation when the product is employed for various certain uses, such as in bottle washing alkalies. For such purposes the presence of these components is beneficial. In fact sodium aluminate has been patented for such purposes; but the sodium beryllonate is much more effective and the amount required is much less to accomplish the same anti-scuffing action. When the reaction is carried out with larger ratios of NaOH indicated, the product can be employed directly for washing glass and ceramic objects.

It should be understood that other materials possessing cleaning- or surface active properties, for example, trisodium-, dissodium-, polymeta- or tetraphosphate or alkali metal carbonates or -bicarbonates or alkali metal silicates or -borates or a combination of these with or without wetting agents may be incorporated with the soluble beryllonates. Such materials may be incorporated with the beryllonate at any desired point in the process, depending upon the nature and chemical properties of the materials included.

While we have described a number of procedures and the preferred embodiment of our invention, and have set forth what we believe to be the correct theoretical explanation of the chemistry involved, it is to be understood that the invention is not limited to such procedures, embodiments or theoretical explanations. The invention may be otherwise practiced within the scope of the appended claims.

We claim:

1. In the process of preparing a water-soluble beryllium compound, the step of heating at atmospheric pressure between 250 and 320° C. powdered beryl with anhydrous sodium hydroxide in the ratio of at least 32 mols of the latter to 1 mol of the former and with between slightly less than 2% and below 5% water content initially present in said mixture, and continuing such heating until a water-soluble beryllium-containing product is formed.

2. In the process of preparing a water-soluble beryllium compound having free caustic soda therein, the step of heating at atmospheric pressure between 250° C. and 320° C., an intimate mixture of powdered beryl with anhydrous caustic soda in the ratio of at least 53 mols of caustic soda to 1 mol of beryl, and with between slightly less than 2% and below 5% water content initially present in said mixture, and continuing such heating until a water-soluble beryllium-containing product is formed.

3. In the process of preparing a water-soluble beryllium compound having free caustic soda therein, the step of heating at atmospheric pressure between 250° C. and 320° C., an intimate mixture of powdered beryl with anhydrous caustic soda in the ratio of at least 76 mols of caustic soda to 1 mol of beryl and with between slightly less than 2% and below 5% water content initially present in said mixture, and continuing such heating until a water-soluble beryllium-containing product is formed.

4. In the process of preparing a water-soluble beryllium compound, the steps of mixing a pulverized water-insoluble beryllium ore with anhydrous, finely divided sodium hydroxide, heating such mixture at atmospheric pressure at a temperature between 250° C. and 320° C., and in the presence of water less than 2% by weight of the entire mass, and continuing such heating until a water-soluble beryllium-containing product is obtained, the ratio of sodium hydroxide to said beryllium ore being at least equal to that required for the $Na_2O$ content of the sodium hydroxide stoichiometrically to combine with the metallic oxides of said beryllium ore.

5. In the process of preparing a water-soluble beryllium compound, the steps of mixing a pulverized water-insoluble beryl with anhydrous sodium hydroxide, heating such mixture at atmospheric pressure and at a temperature between 250° C and 320° C. and in the presence of an amount of water less than 2% by weight of the entire mass, and continuing such heating until a substantially completely water-soluble beryllium-containing product is obtained, the ratio of sodium hydroxide to beryl being at least substantially 32 mols to 1 mol.

PERLE N. BURKARD,
RALPH McNABNEY.

(References on following page)

REFERENCES CITED

The following references are of record in the file of this patent:

UNITED STATES PATENTS

| Number | Name | Date |
|---|---|---|
| 1,820,655 | Fischer | Aug. 25, 1931 |
| 1,966,371 | Zisch | July 10, 1934 |
| 1,986,567 | Ferkel et al. | Jan. 1, 1935 |
| 2,063,811 | Jaeger | Dec. 8, 1936 |
| 2,209,131 | Opatowski | July 23, 1940 |
| 2,419,805 | Wegst et al. | Apr. 29, 1947 |